US006267540B1

(12) United States Patent
Haas

(10) Patent No.: US 6,267,540 B1
(45) Date of Patent: Jul. 31, 2001

(54) DEVICE FOR CREATING A POWDER-AIR-MIXTURE

(75) Inventor: Reiner Haas, Metzingen (DE)

(73) Assignee: Weitmann & Konrad GmbH & Co. KG, Leinfelden-Echterdingen (DE)

( * ) Notice: Subject to any disclaimer, the term of this patent is extended or adjusted under 35 U.S.C. 154(b) by 0 days.

(21) Appl. No.: 09/369,345

(22) Filed: Aug. 6, 1999

(30) Foreign Application Priority Data

Aug. 10, 1998 (DE) ........................................ 198 36 018

(51) Int. Cl.[7] ........................................ B65G 53/14
(52) U.S. Cl. ........................................ 406/153; 406/144
(58) Field of Search ........................................ 406/122, 144, 406/145, 153

(56) References Cited

U.S. PATENT DOCUMENTS

| | | | | |
|---|---|---|---|---|
| 4,807,814 | * | 2/1989 | Douche et al. | 406/153 |
| 5,615,980 | * | 4/1997 | Mauchle | 406/153 |
| 5,645,380 | * | 7/1997 | Rutz | 406/153 |
| 5,676,494 | * | 10/1997 | Ruch | 406/152 |
| 5,873,680 | * | 2/1999 | Huber et al. | 406/153 |

* cited by examiner

*Primary Examiner*—Christopher P. Ellis
*Assistant Examiner*—Joe Jillon, Jr.
(74) *Attorney, Agent, or Firm*—Jones, Tullar & Cooper, P.C.

(57) ABSTRACT

The present invention relates to a device for generating a powder-air mixture, having a powder delivery device, a conveying air feed pipe for the conveying air, and a device for forming an enveloping conveying air jet. The powder delivery device terminates in the conveying air feed pipe and therefore in the enveloping air jet.

11 Claims, 1 Drawing Sheet

DEVICE FOR CREATING A POWDER-AIR-MIXTURE

FIELD OF THE INVENTION

The present invention relates to a device for generating a powder- air mixture, having a delivery device for the powder and a feed pipe for the conveying air.

BACKGROUND OF THE INVENTION

Such devices for mixing a powder with conveying air are sufficiently known. In connection with this, compressed air, for example, is blown into a storage container, the powder stored therein is swirled and a part of the swirled powder is carried out. It is disadvantageous in connection with this device that the amount of powder carried out is greatly dependent on the fill state of the container. However, it is desired that a constant amount of powder be carried out permanently, or at least over a very long period of time, so that fluctuations in the application of the powder to printed sheets of paper are prevented. Moreover, with these devices, the powder-air mixture is difficult to vary, or respectively to adjust it to changing outside conditions.

SUMMARY OF THE INVENTION

The object of the present invention is therefore based on making available a device of the type mentioned at the outset, by means of which the powder-air mixture can be relatively simply adapted to changing outside conditions. It is moreover intended to prevent the powder from being deposited on areas of the noted device and to cake there.

In accordance with the present invention, this object is attained in connection with a device of the type mentioned at the outset in that a device for forming an enveloping air jet for the conveying air is provided, and that the delivery device for the powder terminates in the device for forming an enveloping air jet; and therefore in the enveloping air jet.

It is provided with the device of the present invention that the conveying air is embodied in the form of an enveloping air jet, into which the powder is introduced, in particular aspirated. Here the Venturi principle is advantageously used, in that in the course of the air being formed into an enveloping air jet it is accelerated to high speed, so that the powder is entrained in it. The enveloping air jet prevents the powder from caking on the walls and causing interruptions. In the air mixture the powder is slowly mixed with the conveying air and carried out with it onto sheets of paper.

In connection with a further development it is provided that a feed pipe for the conveying air is arranged orthogonally with respect to the delivery device for the powder. This arrangement permits a space-saving construction, and the present device of the invention can be attached directly, for example underneath, a metering device.

In accordance with the present invention, the feed pipe for the conveying air is formed by a pipe connector. This pipe connector has been rigidly inserted into the delivery device, or is respectively fastened on it, in particular pressed into it. A compressed air hose or the like, through which compressed air is supplied, for example from a compressor, can be connected with this pipe connector, for example.

In a further development it is provided that the delivery device for the powder is constituted by a funnel which, while maintaining an air gap, terminates in an air conduit. Powder is filled into this funnel, for example by a fixed metering device, and falls into the air conduit under the action of gravity. The conveying air is conducted through the lateral distance between the air conduit and the funnel, surrounds the delivery opening of the funnel as an enveloping air jet and picks up the powder, or respectively entrains it. The powder is aspirated from the funnel, so to speak.

In order to achieve the greatest possible air distribution over the entire circumference of the delivery opening of the funnel, the pipe connector terminates via a distributing chamber into the air conduit. The distributing chamber is enclosed, for example, in a sleeve, and sealed against the outside. Initially, the air rises opposite the delivery direction from this distributing chamber, is radially reversed toward the inside and then comes between the funnel and the air conduit, where the enveloping air jet is formed.

The air conduit preferably terminates in a distributing pipe. This distributing pipe widens conically in the delivery direction. By means of this, a reduction of the flow speed is achieved, and moreover the fact, that the powder sticks to the inside of the distributing pipe and cakes there, is counteracted.

In accordance with the present invention, the components are designed as elements turned on a lathe and can therefore be produced relatively simply and cost-effectively.

A further preferred embodiment provides that the axis of the feed pipe for the conveying air and the longitudinal plane of symmetry which is parallel in relation to this axis, are offset with respect to each other. In this way the conveying air is introduced into the delivery device in a decentralized manner, and a spin is forced on it in this way. Therefore the air flows through the distributing chamber also in the circumferential direction, and the enveloping air jet has a spin as a result of this. This spin has the advantage that the enveloping air jet is more stable and does not dissolve as rapidly. In this way the interior wall of the air conduit, as well as that of the distributing pipe, are, inter alia, protected against wear by abrasive powder. Moreover, the operating, or respectively flow noise, are considerably reduced. In addition, the powder is better distributed in the conveying air.

Alternatively or additionally, the delivery device, in particular the air conduit, has air guide devices, for example, spin strips, helical grooves, or the like. By means of these air guide devices it is also possible to force a spin on the air flowing by.

A further advantage of the device of the present invention is seen to be that there is a short distance between the metering device located above the device and the aspirating place at the end of the funnel, which results in extremely short response times, if a clock control of the powder feed is possibly provided.

Further advantages, characteristics and details of the present invention ensue from the following description, in which a particularly preferred exemplary embodiment is described, making reference to the drawings. The characteristics represented in the drawings and mentioned in the claims, as well as in the specification, can here be essential for the present invention, either respectively by themselves or in any arbitrary combination.

DESCRIPTION OF THE PREFERRED EMBODIMENTS

Figure 1:
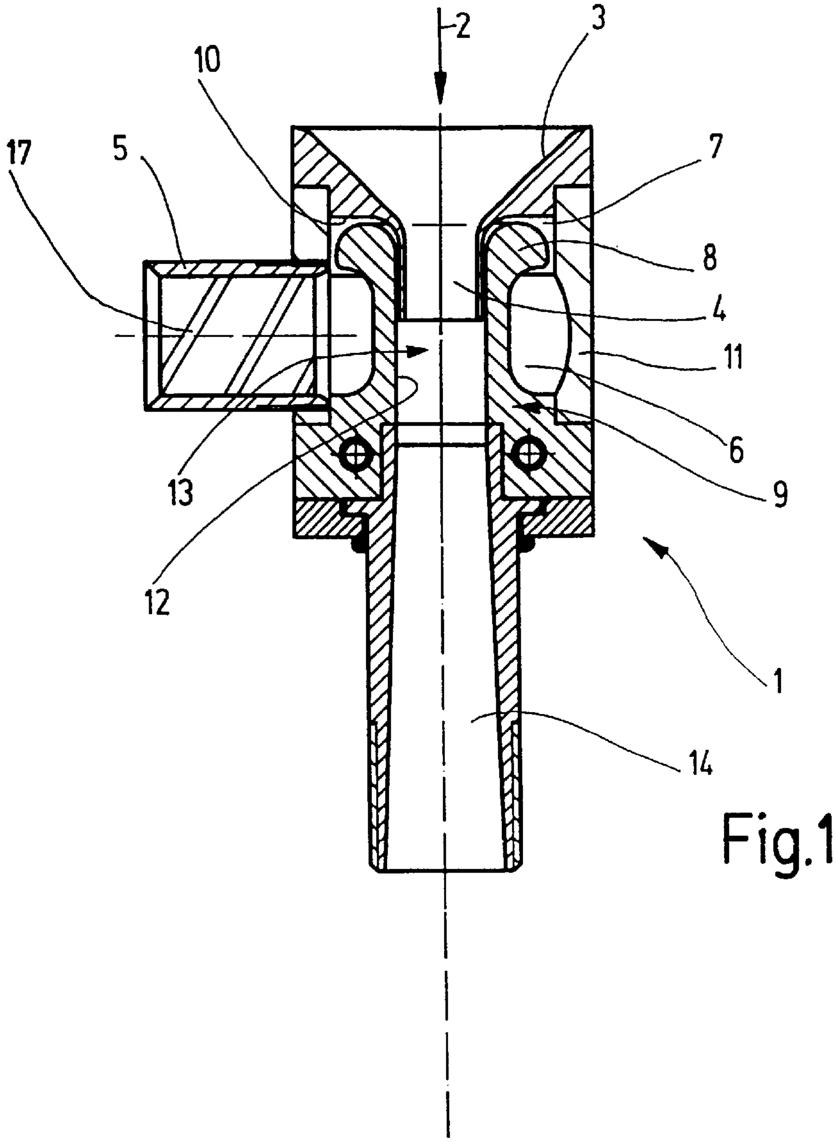
FIG. 1, which is a longitudinal section through the device in accordance with the present invention.

A mixing device, identified by 1 as a whole, of a device for dusting printed sheets of paper, is represented in FIG. 1, in which powder from a storage container (not represented) is conveyed in the direction of the arrow 2 via a fixed metering device (not represented). This fixed metering device is arranged directly above the mixing device 1, so that the conveyed powder falls out of the fixed metering device directly into a funnel 3. This funnel 3 terminates in an aspirating line 4, which is provided directly underneath the funnel 3 and at a short distance from the fixed metering device.

In addition, a pipe connector 5, by means of which compressed air is provided to the mixing device 1, terminates directly in the mixing device 1. This compressed air is generated by a blower or a compressor, in particular a side channel compressor, which is controlled via a frequency converter, or respectively frequency transformer. The pipe connector 5 terminates in a distributing chamber 6, in which the air is evenly conducted upward into an annular chamber 7. This annular chamber 7 is constituted by an upper end 8, which is designed mushroom-shaped in cross section, of an air conduit 9, which will be described in greater detail later. The upper end 8 of the air conduit 9 is seated at a distance in a circumferential groove 10, which is provided on the lower end of the funnel 3. Because of this an annular gap is formed, in which the air is conducted from the pipe connector 5 through the distributing chamber 6 initially upward and around the exterior of the mushroom-shaped end 8 into the circumferential groove 10 of the funnel. The circumferential groove 10 and the distributing chamber 6 are sealed against the outside by a sleeve 11. The air entering the circumferential groove 10 is then conducted radially inward and then axially downward and is then located between the aspirating line 4 and a central bore 12 extending through the air conduit 9. Over this path the air is evenly distributed over the entire circumference of the air conduit 9, and turbulences are removed, i.e. the air is homogenized. This quieted air is continuously accelerated on its flow path, because the flow cross sections decrease from the pipe connector 5 via the circumferential groove 11 until the exit into a feed pipe 13 constituted by the bore, so that an underpressure is created in the aspirating line 4 and air is carried along from the aspirating line 4 in the direction of the feed pipe 13. Since a downward directed, sleeve-shaped air conduit adjoins the circumferential groove 7, which is formed in that the aspirating line 4 is arranged inside the bore 12 and at a distance from the interior wall of the bore, an air jacket is formed, which gets into the feed pipe 13. Because of the underpressure caused by the high flow speed, however, the powder falling out of the funnel 3 is also conveyed in the direction of the feed pipe 13, where it is mixed with the compressed air conveyed by the compressor.

Since the conveying air is initially conducted upward, then radially inward and thereafter downward in the conveying direction, the powder is entrained by the conveying air relatively early, since the funnel can be designed to be very short. This results in short response times in case of dynamic powder metering.

It can be clearly seen in the drawings that the powder, which is conveyed in the direction of the arrow 2, only needs to fall into the funnel 3 and is aspirated from there. The transport direction of the powder is directed vertically downward, and transport primarily is accomplished by gravity. The conveying line 13, which conveys the powder-air mixture into a distributing pipe 14, adjoins the funnel 3. This distributing pipe 14 has an interior wall which widens conically, so that the powder-air mixture flowing through is slowed, and that it is moreover prevented that powder is precipitated on the interior wall and adheres there. At the outlet of the distributing pipe 14 the powder-air mixture is distributed to several individual lines, not represented, through which the mixture is conducted to the individual outlet nozzles.

Figure 2:
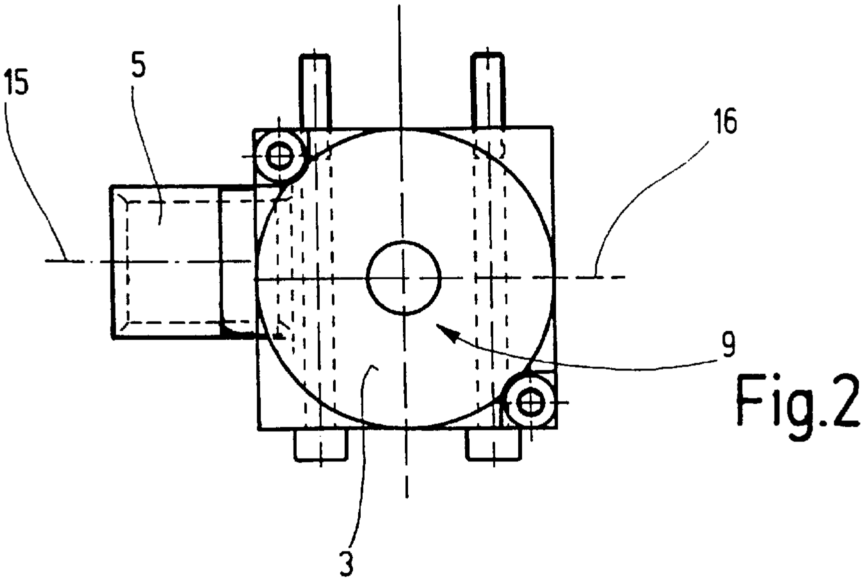
FIG. 2, which is a view from above of the device in accordance with FIG. 1.

With a variation represented in FIG. 2 it is provided that the axis 15 of the pipe connector is laterally offset with respect to the plane of symmetry 16 of the air conduit 9. This arrangement causes a spin to be forced on the air when it flows into the air conduit 9, since it does not flow in symmetrically, but laterally offset. The air maintains this spin, which extends as far as the distributing pipe 14. The spin has the advantage that the air column in the distributing pile 14 is stabilized and that because of the stabilized air column the powder is quasi enclosed in the air column. Adhesion of the powder on the interior wall is still further prevented by this. Furthermore, the spin causes the powder to be better and more evenly distributed in the conveying air.

Further developments provide, that the valve chamber can be additionally or alternatively provided with air guide devices. These air guide devices are provided in the form of spin strips or helical grooves 17 on the inside of the pipe connector 5, or on the sleeve 11 and/or the outside of the air conduit 9. These air guide devices are designed such, that they force a spin on the air.

What is claimed is:

1. A device for generating a powder-air mixture, comprising:

a conveying air feed pipe;

a powder delivery device; and means for forming an enveloping conveying air jet from the air conveyed by said conveying air feed pipe, said powder delivery device terminating in said means for forming an enveloping conveying air jet, and said means for forming said enveloping conveying air jet receiving the air conveyed by said conveying air feed pipe and directing it toward said power delivery device, thereby joining the powder from said powder delivery device to said enveloping conveying air jet.

2. The device as defined in claim 1, wherein said conveying air feed pipe extends orthogonally to said powder delivery device.

3. The device as defined in claim 1, wherein said conveying air feed pipe is configured as a pipe connector.

4. The device as defined in claim 1, wherein said conveying air feed pipe defines an axis, wherein said powder delivery device defines a plane of symmetry, and wherein said axis and said plane of symmetry are offset relative to each other.

5. The device as defined in claim 1, wherein conveyed air is introduced into said conveying air feed pipe in a decentralized manner.

6. The device as defined in claim 1, wherein said conveying air feed pipe includes one of; helical grooves and spin strips forming air guide devices.

7. The device as defined in claim 1, wherein said means for forming an enveloping conveying air jet comprises an air conduit, and wherein said powder delivery device comprises a funnel which terminates in said air conduit.

8. The device as defined in claim 7, wherein said conveying air feed pipe is configured as a pipe connector, said air conduit defining a distributing chamber, and wherein said pipe connector terminates in said air conduit via said distributing chamber.

9. The device as defined in claim 8, further comprising:

a sleeve which surrounds said distributing chamber.

10. The device as defined in claim 7, further comprising:

a distributing pipe, and wherein said air conduit terminates in said distributing pipe.

11. The device as defined in claim 10, wherein said distributing pipe widens conically away from said air conduit.

* * * * *